Nov. 27, 1956　　　H. G. MOLINARI ET AL　　　2,771,710
GLASS SYRINGE BARREL FORMING METHOD AND MACHINE
Original Filed March 21, 1950　　　　　　　　4 Sheets-Sheet 1
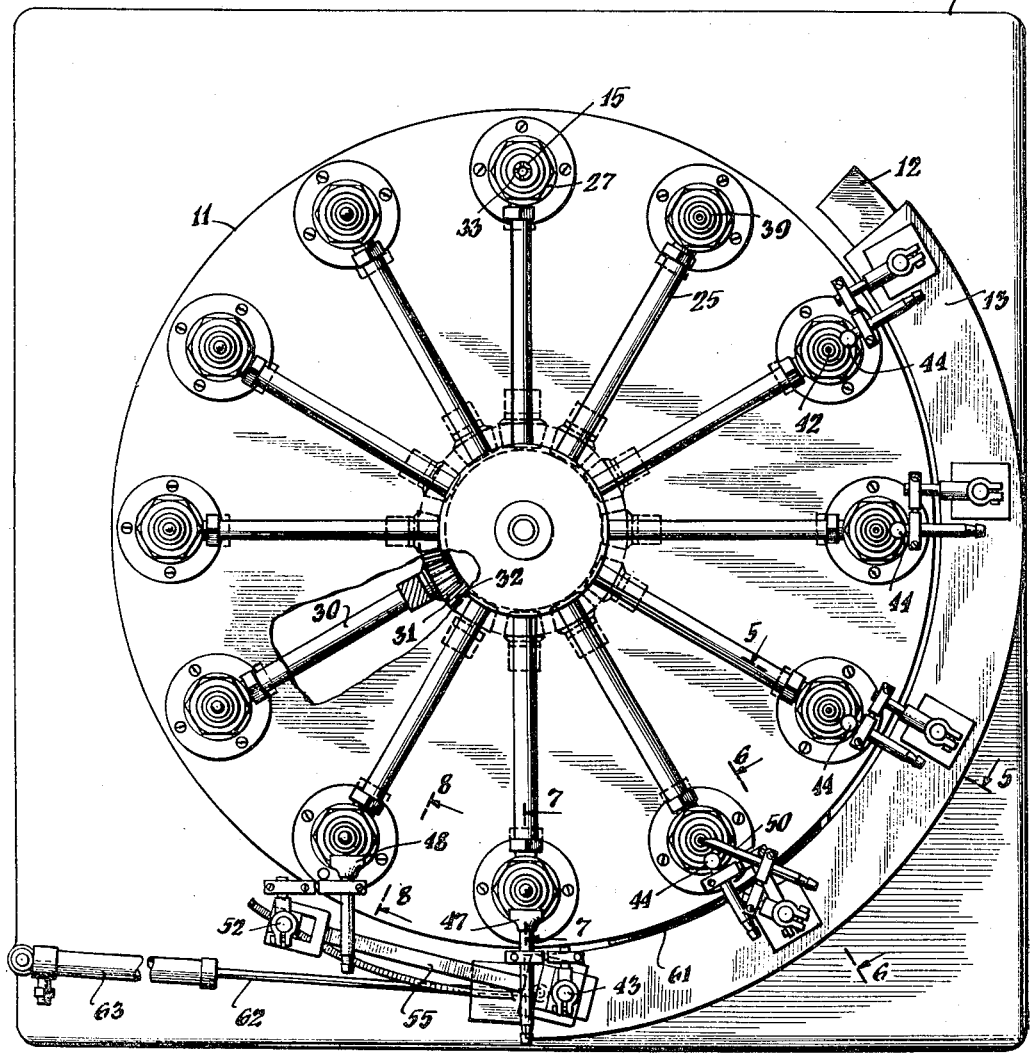
INVENTORS
Henry G. Molinari
Julius V. Magash
BY
ATTORNEYS

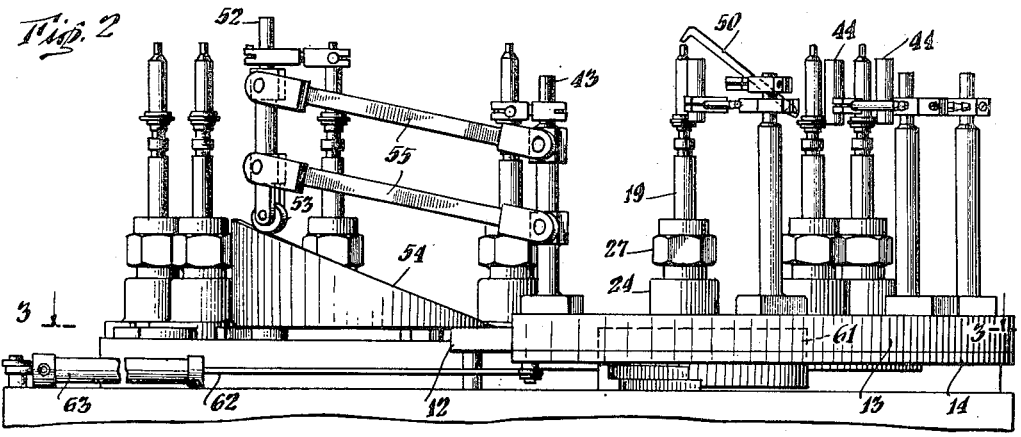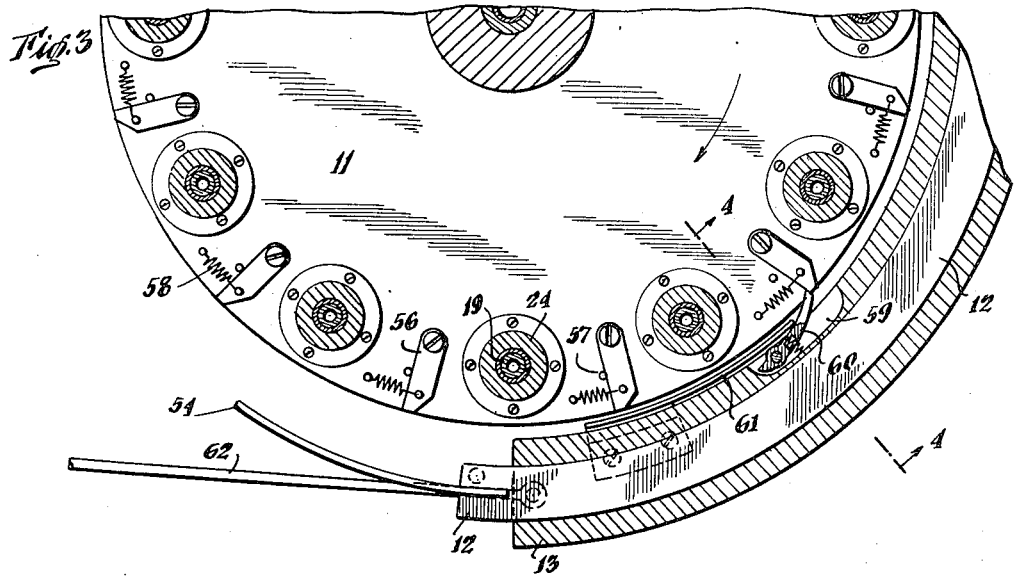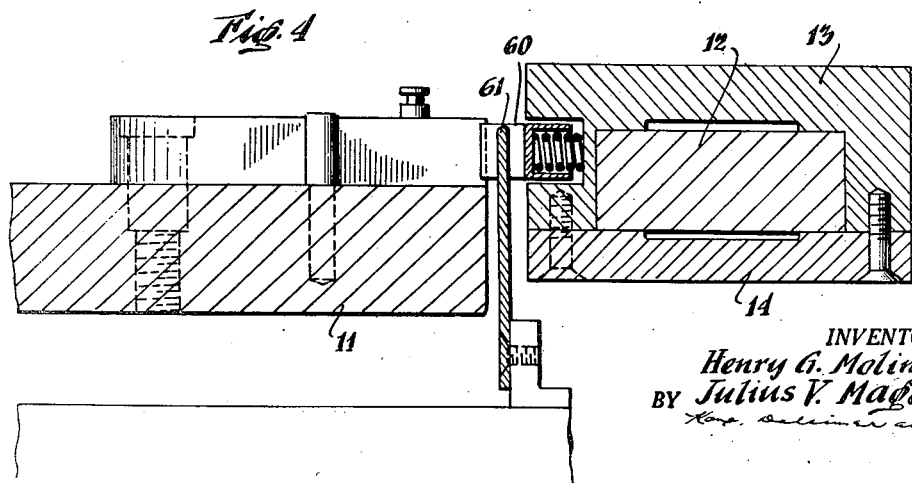

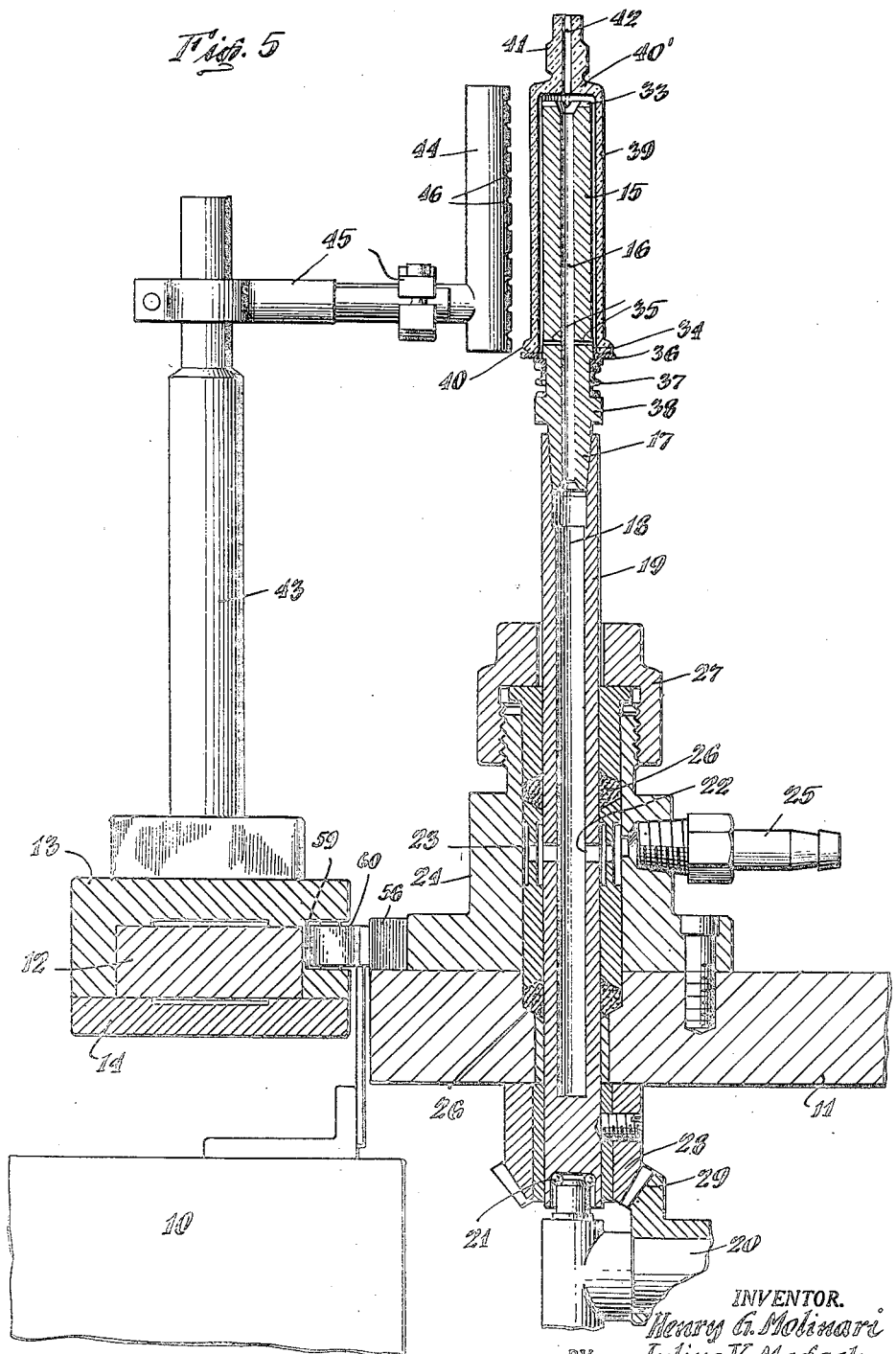

Nov. 27, 1956    H. G. MOLINARI ET AL    2,771,710
GLASS SYRINGE BARREL FORMING METHOD AND MACHINE
Original Filed March 21, 1950    4 Sheets-Sheet 4
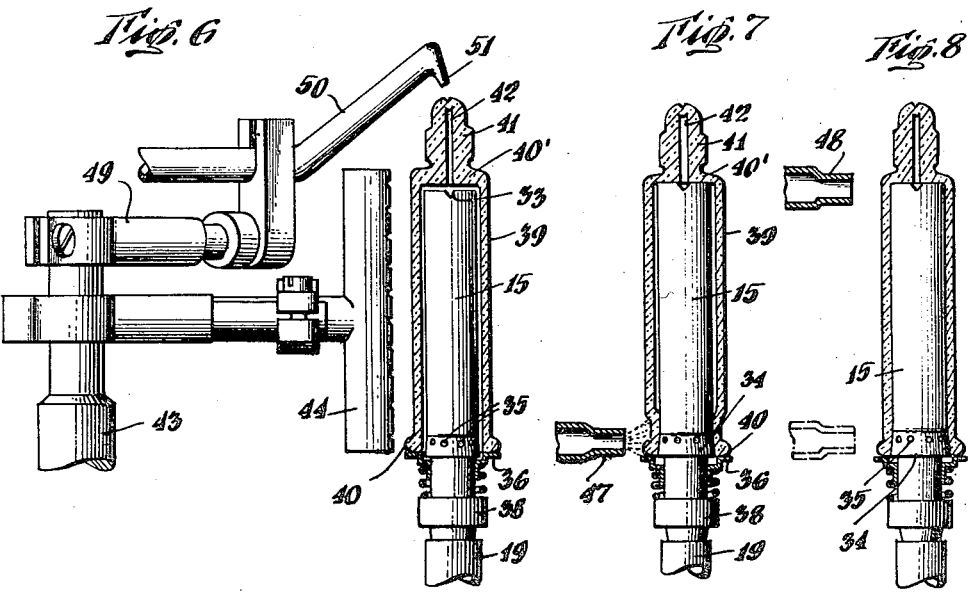
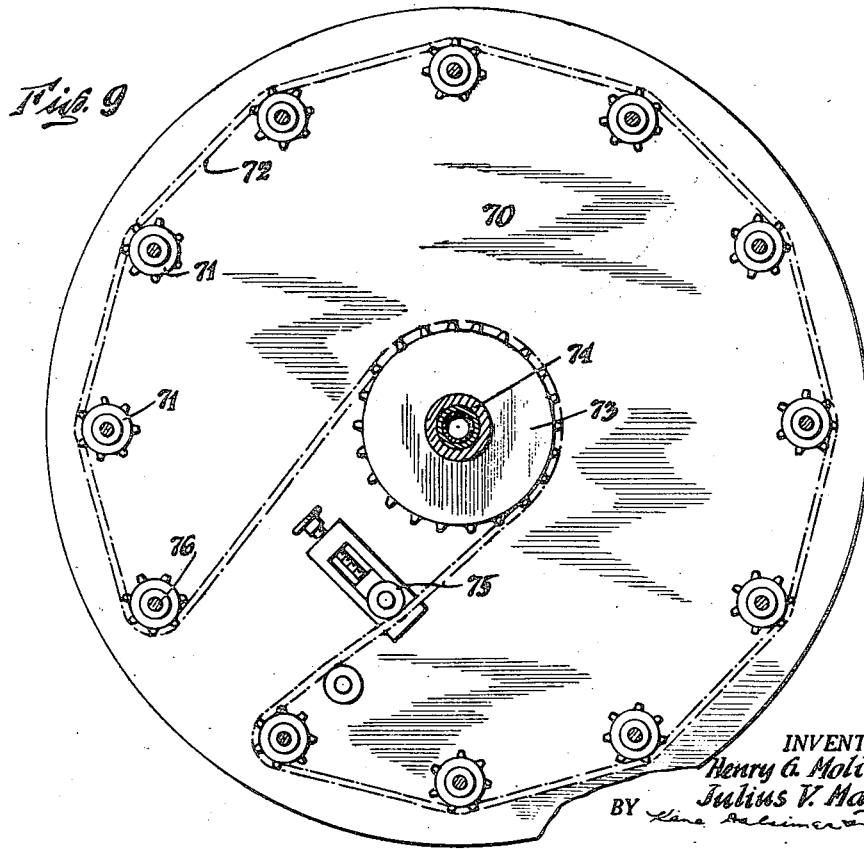
INVENTORS
Henry G. Molinari
Julius V. Magash
BY
ATTORNEYS

United States Patent Office 2,771,710
Patented Nov. 27, 1956

2,771,710

GLASS SYRINGE BARREL FORMING METHOD AND MACHINE

Henry G. Molinari, Rutherford, and Julius V. Magash, Woodridge, N. J., assignors to Becton, Dickinson and Company, Rutherford, N. J., a corporation of New Jersey Continuation of application Serial No. 150,926, March 21, 1950. This application February 18, 1953, Serial No. 337,525

24 Claims. (Cl. 49—7)

This invention relates to a structurally and functionally improved forming machine primarily intended for the production of hypodermic syringe barrels of glass; the present invention providing an improved and/or alternative structure and techniques over that disclosed in the prior United States patent to Henry G. Molinari, No. 2,684,556 dated July 27, 1954, is a continuation of our prior United States application, Ser. No. 150,926, filed March 21, 1950 (now abandoned).

Among the objects of the present invention are those of teaching a method and furnishing an apparatus which will include a relatively simple and rugged design capable of being operated over long periods of time with freedom from all difficulties and under the supervision of relatively unskilled employees; the present machine and method providing for the rapid production of improved units such as syringe barrels, with the percentage of imperfect units being reduced to a minimum amount.

With these and other objects in mind, reference is had to the attached sheets of drawings illustrating practical embodiments of the invention and in which:

Fig. 1 is a plan view of one design of machine embodying the present teachings;

Fig. 2 is a side elevation of the deck portion of that machine;

Fig. 3 is a sectional plan view taken along the line 3—3 and in the direction of the arrows as indicated in Fig. 2;

Fig. 4 is a fragmentary enlarged sectional view taken along the line 4—4 and in the direction of the arrows as indicated in Fig. 3;

Figs. 5, 6, 7 and 8 are transverse sectional views taken along the lines 5—5, 6—6, 7—7, and 8—8 and in the direction of the arrows as indicated in Fig. 1; and Fig. 9 is a somewhat schematic plan view of the drive as applied to the machine.

Primarily referring to Figs. 1 and 2, the numeral 10 indicates the main deck of the machine which may be fixed with respect to its base portion. Disposed upon this deck is a turntable 11 which, as shown may be provided with twelve stations or zones within each of which there is disposed a mandrel, the mounting and design of which will be hereinafter described in detail. These several mandrels are equally spaced and successively receive the syringe barrels or equivalent elements to be shaped or formed by the present machine. An arcuate track 12 or mounting member is disposed adjacent the turntable 11 and extends parallel to the outer edge of the latter. Supported for sliding movement upon this track is a carriage conveniently including a member 13 U-shaped in cross section and the lower face of which is closed by an arcuate strip 14 so that the track 12 is enclosed. This carriage mounts a series of heaters or burners which, as shown, may be six in number and spaced to an extent corresponding to the spacing incorporated in the several mandrel stations. It is obvious that with the carriage traversing track 12, the several burners may be moved in synchronism with the movement of turntable 11 throughout limited distances and thereupon be returned to their initial positions to repeat the cycle. While six burners have been shown as mounted by carriage 13 it is obvious that a greater or lesser number might be so mounted. This would depend upon the number of mandrels associated with the turntable, the number of treating or heating stages to be embodied in the machine, etc., etc.

Attention is next invited to Fig. 5 in which the base or mounting portion 10, the turntable 11, the carriage and the track therefor have been shown in somewhat enlarged section. In that view the numeral 15 indicates the mandrel which is formed with a central bore 16. The lower end of this mandrel is conveniently tapered as indicated at 17 to have a wedge fit with the correspondingly flared upper end of a bore 18 formed in a tube 19. The lower end of this tube is conveniently supported upon a member 20 by means of anti-friction bearings 21. Its bore 18 terminates short of that lower end. The walls of tube 19 are formed with a suitable number of openings 22 which communicate with a space 23 formed in a hub 24 mounted upon turntable 11. A coupling 25 is connected to a suitable source of vacuum (not shown). It also connects with the space 23. Therefore, air may be drawn through bores 16 and 18. Packings 26 may be interposed between hub 24 and tube 19 to prevent undesired air flow. A nut 27 and associated part may be furnished to assure that the packings are maintained in properly tight condition. Adjacent its lower end tube 19 has secured to it a gear 28. The teeth of this gear mesh with the teeth of a gear 29, conveniently mounted by support 20. Generally as indicated in Fig. 1, gear 29 may be mounted by a sleeve 30 which has attached to its inner end a gear 31 meshing with the teeth of a ring gear 32. The latter is driven by a suitable source of power supply.

The bore 16 adjacent its upper end is preferably flared and continued in the form of grooves 33 extending across the end face of mandrel 15. The side face of this mandrel is accurately contoured in circular configuration and its body (when cold) should have a diameter slightly less than the diameter of the bore to be incorporated in the glass barrel or equivalent element. Adjacent the base zone of the forming surface of the mandrel, the latter may be flared; this zone having been indicated by the numeral 34. In the illustration in Fig. 5, this flaring has been exaggerated so that it may be readily visualized. Actually the zone 34 may have an over all length of approximately from ⅛" to 3/16". The amount of flare may be on the order of .001". Within the zone the mandrel may be formed with an annular series of perforations or openings 35 which extend from its outer face in communication with the bore 16. Adjacent the lower edge of zone 34 a support is disposed. This support may take the form of a collar 36 slidably mounted upon the body of the mandrel and normally maintained in a raised position by a spring 37. The upper end of the spring bears against collar 36 and its lower end bears against an outstanding flange portion 38 forming a part of the mandrel body. The value of the spring should be substantially equal to the weight of a barrel or other unit to be formed or shaped by the mandrel surfaces.

That unit, in its preformed stage, will include a cylindrical body 39 presenting at its base or rear end a flange 40. The opposite end of the preform or tube is defined by a wall portion 40' extended in the form of a nose or mounting tip 41. The latter is provided with a bore 42 affording communication with the interior of the barrel. This preform is made of glass or similar material. It may be mounted on the mandrel and dismounted therefrom either by suitable mechanism or manually.

To support the necessary burners upon the carriage, posts 43 may extend upwardly from the latter. A burner 44 may be provided for each post and by means of suitable clamps 45 or equivalent structure, this burner may be adjustably supported. As shown in Fig. 5, the burner has a series of perforations 46 so that when connected to a suitable source of gas a broad heating area will result. Otherwise, the burners may, for example, develop single jets of flame having configurations individual to the operations to be performed.

Ordinarily, however, and as shown in Fig. 1, beginning with the initial burner mounted by the carriage, four succeeding burners may include configurations similar to those just described. The next or fifth burner indicated by the numeral 47 and shown in Fig. 7, may be of the nozzle or single jet type. The final burner indicated by the numeral 48 in Fig. 8 may be of a similar type. As will be understood the fuel mixture fed to the different burners may embrace different characteristics so that flames of different heat intensity are projected. Also the supply to the several burners might be regulated so that different pressures will exist within the successive burners. In any event, in the illustrated embodiment, the first four burners indicated by the reference numeral 44 have, as their primary function, the pre-heating of the unit to be shaped or formed and the bringing of the same to a temperature where the parts are in a substantially plastic condition.

A further burner also forms a part of the machine and serves to seal the tip or extended portion 41 of body 39. This burner has been shown in Figs. 1, 2 and 6. Referring to the latter figure, a clamping and mounting structure has been designated at 49 which is secured to the post 43. This may be at a point immediately above that at which burner 44 is mounted by the post. Described in terms of target and direction, this will be at 5 o'clock in Fig. 1. Nozzle 50 is coupled to a source of gas supply and supported by the mounting 49. This nozzle terminates in a downwardly extending tip portion 51. The latter substantially overlies the upper or outer end of the preform. Therefore, a flame generated under proper pressure will be caused to play against the tip of this preform and will serve to seal the outer end of bore 42 of the same. This will occur simultaneously with the continuing pre-heating and plasticizing action of the flames which are generated by burner 44 mounted upon post 43 at a point immediately below the mounting of nozzle 50.

Nozzles 47 and 48 are formed to define relatively broad flame portions extending in a direction generally transverse and perpendicular to the axis of the preform. Burner 48 is supported by a suitable mounting through post 52. The latter conveniently has at its lower end a bearing member in the form of a roller 53. This bearing member rides upon the edge of a cam 54 conveniently mounted by rail 12. Links 55 extend parallel to each other and have their forward ends connected conveniently to that post 43 which mounts burner 47. Their rear ends are connected at spaced points to post 52. With cam 54 stationary, it follows that as the carriage is oscillated or reciprocated the contact portion of post 52 will ride against the edge of cam 54 so as to be alternately raised and lowered.

To couple the carriage for movement with the turntable a clutching and releasing mechanism is employed. Preferably and as shown especially in Figs. 3 and 4, turntable 11 may pivotly mount an annular series of latch elements 56. A limiting stop 57 is disposed adjacent each of the same and a spring 58 urges the latch to which it is coupled towards that stop. Member 13 of the carriage may be recessed as indicated at 59. A pivoted and spring pressed pawl 60 is mounted in this recess. An actuator in the form of a strip 61 may be fixed against movement with respect to rail 12 and interposed between the edge of the turntable and the carriage so as to intersect the path of travel of pawl 60. With springs 58 incorporating sufficient tension it is apparent that as the pawl is engaged by one of the latches 56 the carriage will be moved along rail 12 in synchronism with the turntable. As the pawl reaches a point at which it is engaged by actuator 61 it will be swung towards the recess 59. Simultaneously the latch 56 engaging the same will be rocked. This action of the parts will continue until the pawl clears the latch.

With the parts laid out as shown, the synchronized movements of the turntable and carriage will occur in a clockwise direction through 30°. If a greater or lesser number of mandrels, burners, etc. are incorporated then, of course, the amount of this arcuate movement may vary to a corresponding extent by properly proportioning the parts. A return of the carriage to its initial position may be effected in any desired manner. As shown, an actuating rod 62 is pivotly coupled to the rear of the carriage. This rod has connected to its outer end a piston (not shown). The latter rides within a cylinder 63 which is conveniently coupled to a source of air supply under pressure. The value of that pressure may be around nine pounds. In any event, as the carriage advances, the piston will shift within the cylinder. As the carriage reaches the end of its motion and is uncoupled from the turntable, the pressure within cylinder 63 will cause the carriage to be returned. The cylinder 63 and piston coupled to rod 62 may incorporate a structure such that the return of the carriage may be effected at relatively high speed but will be cushioned through the last stage of its return movement so that the parts will not be subjected to shock.

In operation, it will be assumed that the mandrels 15 are each positioned upon the tubes 19 which mount them, that couplings 25 are connected to a suitable source of vacuum and that the turntable is rotating. Under these circumstances the tubes and mandrels mounted thereby will also be rotating. As viewed in Fig. 1 and continuing to employ target and direction phraseology an empty mandrel will be present at 12 o'clock. At this station or up to the station at 1 o'clock a preform will be disposed upon the mandrel. Such disposition may occur manually or by means of any suitable mechanism. As the mandrel reaches a position adjacent the 2 o'clock station, the preform mounted thereon will be subjected to heat generated by the first burner or nozzle 44. The mandrel and preform will be rotating and therefore heat will be played or developed against all exterior surfaces of the barrel or tube so that their temperature will be uniformly raised. This action which is initiated at the 2 o'clock station will be continued through to the 3 o'clock station incident to the fact that the carriage carrying with it the first burner 44 will move in synchronism with the turntable between these stations. As the carriage is returned to its initial position the unit will be further pre-heated by the second burner 44 and this action will continue throughout the stations at 3, 4 and 5 o'clock incident to the provision of the third and fourth burners of similar type in this series. The temperature of the pre-form throughout these several stations will be elevated to a point at which its body is in a substantially plastic condition within the zone of the 5 o'clock station.

It is to be remembered that at the latter station the tip-sealing nozzle 50 is mounted. As flame is played upon the nose or tip portion of the barrel at this station the outer end of that portion will collapse upon itself as indicated in Fig. 6 and the tip will be sealed. During the foregoing sequence of operation the end wall 40' of the preform has been maintained out of contact with the end face of mandrel 15. This is because of the support furnished by collar 36. By maintaining this spacing of the parts, there has been no danger of the end wall engaging the heated mandrel end with consequent liability of fracturing of the end wall 40'.

By a suitable control structure, bore 18 is connected immediately in advance of the station at 6 o'clock in Fig. 1 to the source of vacuum. This will cause suction to be exerted within the bore of the preform. With the flame generated by nozzle 47 playing against flange 40 of the preform, and due to the flow of air which will occur through the annular series of openings or perforations 35, the flange portion of the nozzle will be constricted into intimate contact with the exterior surface of the mandrel in line with zone 34. Therefore, a sealing contact will be established between the outer mandrel face and the adjacent surface of the preform; this action occurring incident to the suction effect of the air passing through the perforations 35, the substantially plastic condition of the preform and the natural collapsing tendency of the latter incident to the action of the flame generated by burner or nozzle 47.

Under the action of the continuing suction through bores 16 and 18 the preform will move downwardly upon the mandrel so that the latter will bottom against the end wall 40'. In that position suction will nevertheless be continued within the bore of the preform because of the grooves 33. As will also be understood, due to the range of movement of the collar 36 or equivalent support, variations in the depth of the barrel and the width of the supporting flange will have no effect on the forming and finishing of the surfaces of the successive units operated upon by the machine. Due to the aforementioned continuing suction exerted and the weight of the unit the latter will now have moved from the position shown in Fig. 6 to that shown in Fig. 7.

In that view the collapsing of the barrel into sealing contact with the mandrel has been illustrated adjacent the flange zone in a somewhat exaggerated manner. As the unit is moved by the turntable from the 6 o'clock to the 7 o'clock station, nozzle 48 will traverse the barrel body from the position indicated in dash lines in Fig. 8 to that shown in full lines in that figure. In such traversal it will cause a collapsing or shrinking of the barrel into intimate contact with the mandrel surfaces from a point adjacent the base or flange of the barrel to a point in line with its end wall 40'. As the unit reaches the 7 o'clock station its formation is completed and it conforms precisely to the mandrel surfaces insofar as its interior bore faces are concerned.

Through the 8, 9, and 10 o'clock stations a cooling of the unit occurs. During that cooling and due to the difference in the co-efficient of expansion between the metal mandrel and the preform of glass or other material the mandrel will shrink away from the bore of the unit. Therefore, it may readily be removed therefrom. This removal may occur at, for example, the 11 o'clock station or between that station and the 12 o'clock station. Removal is conveniently effected either manually or by means of a suitable delivering mechanism. After removal, a unit to be formed is disposed upon the mandrel and in such disposition the mandrel will not bottom against the end wall of the unit. The entire cycle may now be repeated.

Under certain circumstances it may be desired not to drive the mandrels and the parts mounting the same by means of gears such as 28 and 29 and sleeves 30. In that event and as shown in Fig. 9 a turntable 70 may be provided which rotatably supports on its under face, gears 71. The teeth of the latter are engaged by the links of a driving chain 72 which passes around a sprocket 73 affixed to the center support 74. A tensioning unit 75 may cooperate with the sprocket. Therefore as the turntable rotates it is apparent that chain 72 will be moved incident to its engaging with the teeth of sprocket 73. As a consequence of that movement sprockets or gears 71 will be rotated. Therefore, the lower ends of supporting members 76 carrying the gears 71 will likewise be rotated. These members correspond to the tubes 19 as aforedescribed. Consequently mandrel rotation will be effected.

Thus, among others, the several objects of the invention as specifically aforenoted are achieved. Obviously numerous changes in construction and rearrangement of the parts might be resorted to and the steps of the method might be varied without departing from the spirit of the invention as defined by the claims.

We claim:

1. A forming machine including in combination a mandrel to receive a tube body, a support to limit the telescopic disposition of a tube over said mandrel, means exposing the mandrel to heat and means whereby said supporting means may shift to cause said mandrel to enter said tube to a greater extent.

2. A forming machine including in combination a mandrel to receive a tube body, a support to limit the telescopic disposition of a tube over said mandrel, means exposing the mandrel to heat, said mandrel being formed with a passage through which vacuum may act to shift a supported tube with respect to said mandrel to cause the latter to be projected into the former and said support being mounted to be similarly shiftable.

3. A forming machine including in combination a mandrel to receive a tube body, a support movably disposed with respect to said mandrel and to be engaged by a supported tube to limit the telescopic disposition of the latter with respect to the mandrel, means urging said support to maintain such tube-limiting position and means whereby said supporting means may shift to cause said mandrel to enter said tube to a greater extent.

4. A forming machine including in combination a mandrel to receive a tube body, a support movably disposed with respect to said mandrel and to be engaged by a supported tube to limit the telescopic disposition of the latter with respect to the mandrel, yieldable means acting against said support to maintain such tube-limiting position and means whereby said supporting means may shift to cause said mandrel to enter said tube to a greater extent.

5. A machine for forming barrels having an open end and a substantially closed end, said machine including a mandrel to extend into the open barrel end, means for exposing the mandrel and supported barrel to the action of heat, a support to limit the telescoping of the barrel with respect to said mandrel to maintain the inner face of the former spaced from the adjacent mandrel end and means whereby said support may shift to cause said mandrel to be projected to a position at which its outer end is immediately adjacent the inner closed end face of said barrel.

6. A forming machine including in combination a mandrel to extend into the open end of a barrel the opposite end of which is closed and which mandrel has a length greater than that of said barrel, means to support said barrel to initially retain the latter with its closed end spaced from the adjacent mandrel end and means for bringing said ends to positions at which they are in immediate proximity.

7. A forming machine including in combination a mandrel to extend into the open end of a barrel the opposite end of which is closed and which mandrel has a length greater than that of said barrel, means to support said barrel to initially retain the latter with its closed end spaced from the adjacent mandrel end and vacuum controlled means for causing said mandrel to be projected relatively to said barrel to bring the adjacent mandrel and closed barrel ends into immediate proximity.

8. A machine to form a barrel having one open end and an opposite end closed except for a bored tip, said machine including in combination a mandrel to extend into the open end of the barrel, means for exposing the side face of the barrel and mandrel to heat, separate means for closing the bore of said tip and means for causing said barrel to conform to the mandrel surface.

9. A machine to form a barrel having one open end and an opposite end closed except for a bored tip, said machine including in combination a mandrel to extend into the open end of the barrel, means for exposing the side face of the barrel and mandrel to heat, separate means for closing the bore of said tip, supporting means for maintaining the adjacent ends of said barrel and mandrel spaced from each other and means for causing said barrel to conform to the mandrel surface.

10. A machine to form a barrel having one open end and an opposite end closed except for a bored tip, said machine including in combination a mandrel to extend into the open end of the barrel, means for exposing the side face of the barrel and mandrel to heat, separate means for closing the bore of said tip, supporting means for maintaining the adjacent ends of said barrel and mandrel spaced from each other, means whereby said supporting means may shift with respect to said mandrel and means for causing said barrel to conform to the mandrel surface.

11. A forming machine including in combination a rotatable turntable, a series of mandrels each to receive a tube, a carriage, tube and mandrel-heating means supported by said carriage at points adjacent said mandrels, means for coupling said carriage to move with said turntable and means periodically disconnecting said carriage from said turntable.

12. A forming machine including in combination a rotatable turntable, a series of mandrels each to receive a tube, a carriage, tube and mandrel-heating means supported by said carriage at points adjacent said mandrels, means for coupling said carriage to move with said turntable, means periodically disconnecting said carriage from said turntable and means for returning said carriage to its initial position while so disconnected.

13. A forming machine including in combination a rotatable turntable, a series of mandrels each to receive a tube, a carriage, tube and mandrel-heating means supported by said carriage at points adjacent said mandrels, means for coupling said carriage to move with said turntable, means periodically disconnecting said carriage from said turntable, means for returning said carriage to its initial position while so disconnected and means for cushioning the return movement of the carriage.

14. A forming machine including in combination a rotatable turntable, a series of mandrels each to receive a tube, a carriage, tube and mandrel-heating means supported by said carriage at points adjacent said mandrels, means for coupling said carriage to move with said turntable, a further tube and mandrel-heating means, means to support said latter heating means for movements axially of a mandrel and tube and means for causing such movement as said carriage moves with said turntable.

15. A forming machine including in combination a mandrel to extend into the open end of a barrel, the opposite end of which is closed and which mandrel has a length greater than that of said barrel, means to support said barrel—irrespective of the length of the latter—to initially retain the same with its closed end substantially spaced from the adjacent mandrel end and means for thereafter shifting said adjacent ends to positions at which they are in immediate proximity.

16. A machine to form a barrel having one open end and an opposite end closed except for a bored tip, said machine including a movable mandrel to extend through the open end of the barrel, means for pre-heating a thus supported barrel, a separate heating means for closing the tip of the same and final heating means for causing said barrel to conform to the surfaces of said mandrel.

17. In a forming machine, a mandrel to receive a tubular glass preform having an open inner end, said mandrel comprising a cylindrical body having outer and inner ends and formed with an axially extending bore, said mandrel being also formed with a series of openings in its face at a point adjacent its inner end and at which the open end of the preform is to be disposed; said openings being connected with said bore and the latter being connectible with a source of suction and said mandrel being formed with at least one transverse passage communicating with said bore adjacent the outer end of the mandrel.

18. In a forming machine as specified in claim 17, a member extending outwardly from said mandrel at a point between said series of openings and its inner end and said member providing a support for the open inner end of a preform.

19. In a mandrel as specified in claim 17, said mandrel having its outer surface flared in the direction of its inner end and said series of openings lying within such flared surface.

20. In a structure as specified in claim 19, a support mounted by said mandrel and extending outwardly therefrom at a point between said series of openings and the inner mandrel end and said support engaging the edge defining the open end of the preform to support the latter in overlapping relationship with respect to said series of openings.

21. A method of forming a syringe barrel which includes employing a tubular preform having one open end and an opposite end which is closed except for a bored tip, sealing said tip and progressively heating and shrinking said tube from its open end in the direction of said tip.

22. In a machine for forming glass hypodermic syringe barrels from preforms each having an open and a closed end, a cylindrical mandrel having an inner and an outer end and being formed with a bore extending between such ends, said bore being connectible with a source of vacuum, said mandrel being formed with axially spaced passages extending outwardly from said bore and said mandrel being disposable within the body of the preform through the open end of the latter to a point where the outer mandrel end is arranged adjacent the closed preform end, one of said mandrel passages extending adjacent said outer mandrel end, another mandrel passage extending substantially at the point adjacent which the open end of the preform lies, the intervening mandrel surface between said passages being uninterrupted and a support for the open end of said preform carried by said mandrel at a point beyond said last-named passage.

23. A method of forming a hypodermic syringe barrel which includes employing a tubular preform having a length substantially equal to that of the finished barrel, open opposite ends and a bore of larger diameter than the exterior diameter of a cylindrical mandrel, introducing the outer end of the mandrel through the open inner end of the preform to ensleeve the latter upon said mandrel, closing the opposite outer preform end while yieldingly supporting the preform and maintaining it substantially out of engagement with the adjacent mandrel surface with an uninterrupted space, free from all obstruction, existing between the adjacent outer mandrel face and the bore face of the preform from its closed outer end to its inner end, heating the preform in a zone in line with the edge defining its inner end to cause its bore to constrict into sealing contact with the mandrel in such zone, subjecting the space between the mandrel and preform bore to the action of vacuum to move the preform into engagement with the top of the mandrel, heating the preform beginning with its zone of sealing contact with the mandrel and continuing in the direction of its closed opposite end in line with such space to render the preform plastic from such zone toward its outer end to cause atmospheric pressure to collapse the preform into intimate contact with the remainder of the mandrel face and thus impart to the bore a purely cylindrical configuration, cooling said preform and mandrel to cause the latter to shrink out of contact with the bore surface and sliding the barrel—resulting from the steps to which said preform has been subjected—in an outward direction over said mandrel to remove it therefrom.

24. A method of forming a hypodermic syringe barrel from a glass tubular preform having an open upper end, an open lower end defined by an outwardly extending flange and the length of which preform is substantially equal to the length of the finished syringe barrel, said method including introducing the upper end of a metal forming mandrel through the lower flanged end of the preform and supporting the latter by the mandrel while yieldingly supporting the preform and to have the upper mandrel end extend to a point short of the upper preform end and with an uninterrupted space—free from all obstruction—existing between the adjacent mandrel and preform bore faces from the lower to the upper ends of the preform, closing the upper end of the preform while maintaining it substantially out of engagement with the adjacent mandrel surface, heating the lower end of the preform in line with its flange to constrict the adjacent bore face thereof into sealing contact with the mandrel face, thereupon subjecting the space existing between the mandrel and preform faces to the action of vacuum to move the preform into engagement with the top of the mandrel, heating the outer preform face beginning with its zone of sealing contact with the mandrel and continuing in the direction of its closed upper end in line with such space to cause atmospheric presure to collapse the preform into intimate contact with the mandrel face and thus impart to its bore a purely cylindrical configuration, cooling the mandrel and preform whereby the former will shrink out of contact with the bore of the latter and lifting said preform upwardly over the mandrel to remove it therefrom.

References Cited in the file of this patent

UNITED STATES PATENTS

| | | |
|---|---|---|
| 680,306 | Wilson | Aug. 13, 1901 |
| 1,999525 | Morscholz | Apr. 30, 1935 |
| 2,209,739 | Meyer | July 30, 1940 |
| 2,490,252 | Brewer | Dec. 6, 1949 |
| 2,531,394 | Campbell | Nov. 28, 1950 |

FOREIGN PATENTS

| | | |
|---|---|---|
| 497,486 | Great Britain | Dec. 19, 1938 |